(12) United States Patent
Griffin et al.

(10) Patent No.: US 8,624,149 B2
(45) Date of Patent: Jan. 7, 2014

(54) PLASMA TORCH WITH REVERSIBLE BAFFLE

(75) Inventors: David Charles Griffin, Florence, SC (US); Gregory William Diehl, Florence, SC (US); Christopher Reed Martin, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 179 days.

(21) Appl. No.: 13/348,281

(22) Filed: Jan. 11, 2012

(65) Prior Publication Data

US 2013/0175244 A1 Jul. 11, 2013

(51) Int. Cl.
*B23K 10/00* (2006.01)
*H05H 1/34* (2006.01)

(52) U.S. Cl.
USPC .............. 219/121.48; 219/121.5; 219/121.51; 219/75

(58) Field of Classification Search
CPC .................................. H05H 1/34; B23K 10/00
USPC .............. 219/121.36, 121.48, 121.49, 121.5, 219/121.51, 74, 75, 137.42
See application file for complete search history.

(56) References Cited

U.S. PATENT DOCUMENTS

| | | | | | |
|---|---|---|---|---|---|
| 3,667,371 | A | * | 6/1972 | Russell | 126/299 D |
| 4,207,925 | A | * | 6/1980 | Nelson | 138/44 |
| 5,275,735 | A | * | 1/1994 | Stearns | 210/628 |
| 5,680,014 | A | * | 10/1997 | Miyamoto et al. | 315/111.41 |
| 8,258,423 | B2 | * | 9/2012 | Severance et al. | 219/121.48 |

* cited by examiner

*Primary Examiner* — Mark Paschall
(74) *Attorney, Agent, or Firm* — Kacvinsky Daisak PLLC

(57) ABSTRACT

A plasma arc torch includes an annular baffle defining distinct faces A, B, C, and D. Faces A and C are opposite from each other, and faces B and D are opposite from each other. First passages for fluid flow extend between the faces A and C, and second passages extend between the faces B and D. The baffle is installable in an annular space between an inner wall and an outer wall, in either of two orientations. In a first orientation, the first passages are open to fluid flow and the second passages are closed by engagement of the inner and outer walls with the faces B and D, and in a second orientation, flipped over relative to the first orientation, the second passages are open to fluid flow and the first passages are closed by engagement of the inner and outer walls with the faces A and C.

17 Claims, 6 Drawing Sheets

PLASMA TORCH WITH REVERSIBLE BAFFLE

BACKGROUND

The present application relates to plasma arc torches.

Plasma torches are commonly used for cutting, welding, or marking metal work pieces. In general, plasma torches employ an electrode to generate an electric arc within the torch. A high-velocity gas is flowed through the torch, and the electric arc ionizes the gas, creating a plasma. The high-velocity stream of ionized gas, or plasma, is delivered through a nozzle of the torch towards the work piece that is to be operated upon. The plasma serves to conduct electricity from the torch to the work piece. In this way, the plasma heats the work piece, melting the metal in the desired location.

Baffles are commonly used in plasma arc torches to control the flow of gasses or liquids. Baffles can be used, for example, to throttle the flow and/or to impart swirl to the flow. Swirl-inducing baffles are generally referred to as swirl baffles, or alternatively as diffusers.

A common type of swirl baffle is an annular ring having flow passages extending between the radially inner and outer surfaces of the ring. The passages extend non-radially, i.e., with a tangential component of direction, so that swirl is imparted to the fluid flowing through the passages. Some swirl baffles of this type have a configuration that allows them to be inadvertently installed upside down relative to the proper orientation. When the swirl baffle is incorrectly installed upside down, the swirl direction imparted by the baffle is the opposite of the intended direction. This can cause problems in some cases, such as when a downstream component's design is such that it works properly only when it receives swirl of a particular sense.

BRIEF SUMMARY OF THE DISCLOSURE

Embodiments of the present invention described herein address the above-noted issue, and some embodiments provide additional/different functionalities that can be advantageous in plasma arc torches and processes.

In one exemplary embodiment, a plasma arc torch is described, comprising a main torch body, an electrode, and a nozzle, a generally annular fluid flow passage being defined within the torch between a radially inner wall and a radially outer wall for flow of a fluid therethrough. The torch further comprises a generally annular baffle disposed in the generally annular fluid flow passage and engaging the radially inner and radially outer walls thereof. The baffle defines distinct faces A, B, C, and D, a set of first passages extending between the faces A and C, and a set of second passages extending between the faces B and D.

The faces of the baffle and the radially inner and outer walls of the annular fluid flow passage are configured to cooperate such that in a first orientation of the baffle the first passages are open to fluid flow and the second passages are closed to fluid flow by engagement of the radially inner and outer walls with the faces B and D. In a second orientation of the baffle, flipped over relative to the first orientation, the second passages are open to fluid flow and the first passages are closed to fluid flow by engagement of the radially inner and outer walls with the faces A and C.

The annular flow passage and baffle as described above can be configured in any of various ways to achieve various objectives. For example, in one embodiment, the first passages are configured to provide a first flow characteristic to the fluid flowing therethrough, and the second passages are configured to provide a second flow characteristic to the fluid flowing therethrough, the first and second flow characteristics differing from each other. The flow characteristic can be, for example, flow rate. Thus, when the baffle is installed in the first orientation, a first flow rate can be imparted by the baffle. When the baffle is flipped over and installed in the second orientation, the baffle can impart a second flow rate that is higher or lower than the first flow rate.

Alternatively the flow characteristic can be swirl magnitude and/or swirl direction. Thus, in another embodiment, the first passages are configured to impart swirl of a first magnitude and a first direction to the fluid flowing therethrough, and the second passages are configured to impart swirl of a second magnitude and a second direction to the fluid flowing therethrough. Various baffle configurations are possible. As one example, the baffle passages can be configured such that the first and second directions of the swirl are the same. That is, with the baffle installed in either of its two possible orientations (right side up or upside down), the resulting swirl direction is the same. The first and second magnitudes of the swirl can also be the same, such that the baffle is completely reversible without affecting performance in any way. In this manner, it is impossible to inadvertently install the baffle in a way that will adversely affect the torch operation.

Alternatively, it is possible to configure the passages so that the swirl is greater in one orientation than in the other, which may be useful in cases where it is desirable to use the same torch for different processes having different optimum swirl levels.

The baffle can be configured in various other ways. For example, each of the first passages can comprise a surface groove extending between the faces A and C, and each of the second passages can comprise a surface groove extending between the faces B and D.

Alternatively, each of the first passages can comprise a hole extending between the faces A and C, and each of the second passages can comprise a hole extending between the faces B and D.

In some embodiments, each of the faces A, B, C, and D of the baffle can be substantially conical, and the radially inner and outer walls of the generally annular fluid flow passage can define substantially conical surfaces, the substantially conical faces of the baffle engaging the substantially conical surfaces of the walls so as to radially center the baffle with respect to the walls. This can also serve to radially locate other components. For example, the inner wall of the annular fluid flow passage can be part of an inner component (e.g., a primary nozzle) and the outer wall can be part of an outer component (e.g., a secondary or shield nozzle) that surrounds the inner component. The conical surfaces of these components and the baffle can serve to radially center all of them with respect to one another.

The radial centering of the baffle relative to the torch components defining the generally annular fluid flow passage has utility more generally with any baffle, including those that do not have two sets of passages. In accordance with one embodiment of the invention, a plasma arc torch comprises a main torch body, an electrode, and a nozzle, a generally annular fluid flow passage being defined between a radially inner wall and a radially outer wall for flow of a fluid therethrough, the torch further comprising a generally annular baffle disposed in the generally annular fluid flow passage and engaging the radially inner and radially outer walls thereof, the baffle defining flow passages therethrough, and wherein each of the radially inner and outer walls of the generally annular fluid flow passage defines a substantially conical surface, and the baffle defines an inner conical surface and an outer conical surface, the inner and outer conical surfaces of the baffle respectively engaging the substantially conical surfaces of the inner and outer walls of the generally annular fluid flow passage so as to radially center the baffle with respect to the walls.

Additional embodiments of the invention and/or advantages achievable thereby are described herein or would be obvious to persons of ordinary skill in the art.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
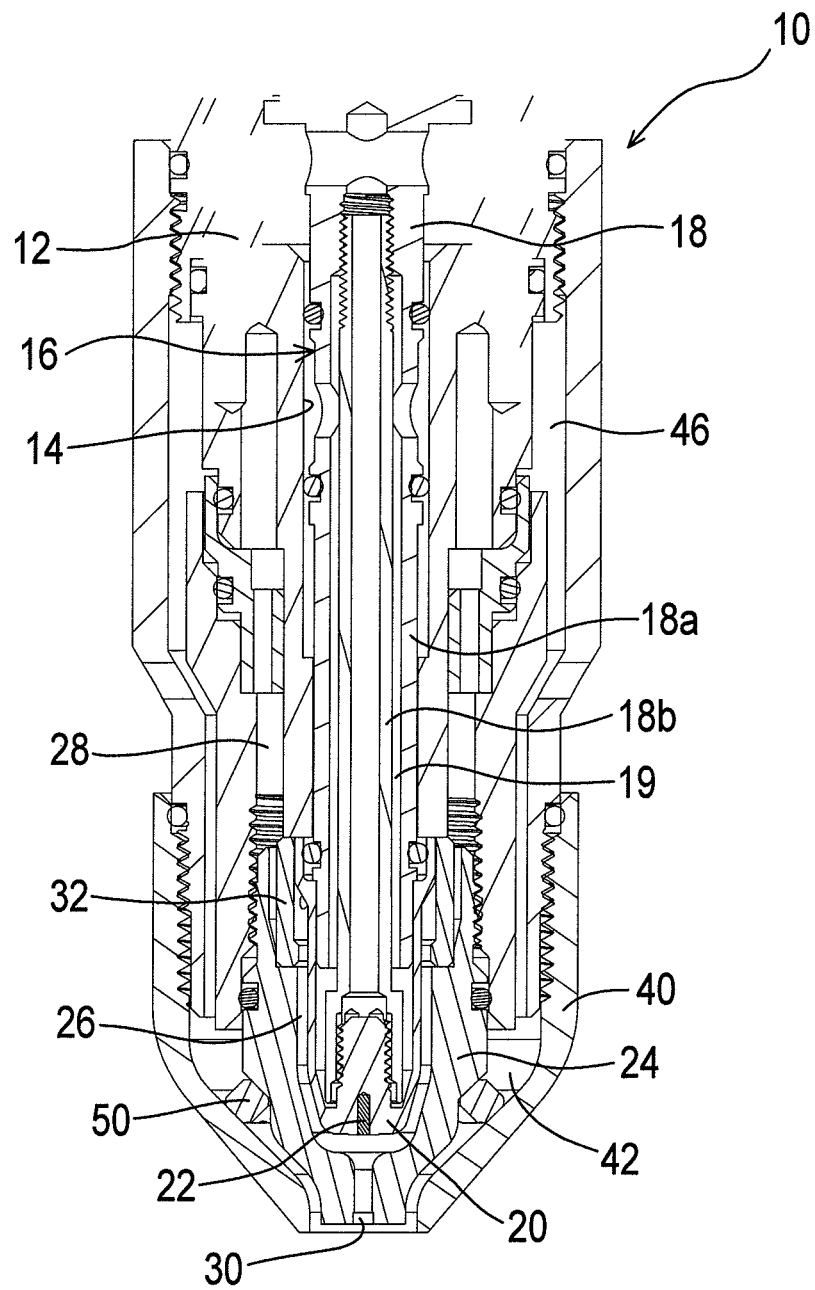
FIG. 1 is a cross-sectional view of a plasma arc torch in accordance with one embodiment of the invention.

Embodiments of the present invention now will be described more fully hereinafter with reference to the accompanying drawings, in which some but not all embodiments are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

A plasma torch 10 in accordance with an embodiment of the present invention is shown in FIG. 1. The torch includes a main torch body 12 having a central bore 14 through which an electrode assembly 16 extends. The electrode assembly 16 comprises an electrode holder 18 having an outer tubular member 18a and an inner tubular member 18b between which an annular space 19 is defined. The inner tubular member 18b comprises a coolant tube whose upper end is externally threaded for engaging internal threads in the outer tubular member 18a. The lower end of the coolant tube 18b is internally threaded for receiving an externally threaded nipple of an electrode 20. The electrode 20 has a front face in which an emissive element 22 is embedded. The emissive element 22 is operable to emit an electric arc when a voltage potential difference is created between the electrode 20 and another member to which the arc extends. Coolant supplied into the coolant tube 18b circulates around the back (interior) side of the electrode 20 to cool the electrode.

The torch 10 further includes a primary nozzle 24 that surrounds the electrode 20 and is electrically isolated from the electrode. An annular gas flow passage 26 is defined between the nozzle 24 and the electrode 20. Gas is fed to the passage 26 via a gas supply passage 28 defined in the torch. The nozzle 24 defines an orifice 30 through which the gas is discharged toward a workpiece. A swirl baffle 32 disposed between the nozzle 24 and the electrode assembly 16 imparts swirl to the gas flowing from the passage 28 into the passage 26, so that the gas discharged from the nozzle orifice 30 is a swirling jet that surrounds the electric arc emitted from the emissive element 22.

A secondary nozzle, or shield, 40 surrounds the primary nozzle 24 and there is an annular fluid flow passage 42 between them. The shield 40 defines an orifice 44 for discharge of shield fluid toward the workpiece. A secondary or shield fluid is supplied to the passage 42 from a shield fluid supply passage 46 defined in the torch. The shield fluid can be a gas or can be a liquid such as water, depending on the intended application of the torch.

A baffle 50 is disposed in the annular passage 42 between the nozzle 24 and the shield 40. The baffle 50 is generally annular and defines passages for flow of the shield fluid. With reference to FIGS. 1A, 2, 3, 4, and 5, the baffle 50 includes four distinct faces A, B, C, and D, each of which is substantially conical in the illustrated embodiment. The faces A and C lie opposite each other, and the faces B and D lie opposite each other. Faces A and D face generally radially inwardly, and faces B and D face generally radially outwardly.

The nozzle 24 defines a substantially conical wall 25 (FIG. 1A) and the shield 40 defines a substantially conical wall 41 opposite from the wall 25. The nozzle wall 25 is configured to lie flat against the face A of the baffle, and the shield wall 41 is configured to lie flat against the face C of the baffle. Additionally, the baffle is configured to be reversible in orientation (i.e., flipped over relative to the orientation shown in FIG. 1A). In the flipped-over orientation, the nozzle wall 25 lies flat against the face D and the shield wall 41 lies flat against the face C.

With reference to FIGS. 2 through 5, the baffle 50 defines a set of first passages 52 that extend between the faces A and C, and a set of second passages 54 that extend between the faces B and D. In the embodiment of FIGS. 2-5, the first passages 52 comprise surface grooves formed in the face B and of sufficient depth to extend partially into the faces A and C. Similarly, the second passages 54 comprise surface grooves formed in the face C and of sufficient depth to extend partially into the faces B and D.

Figure 1A:
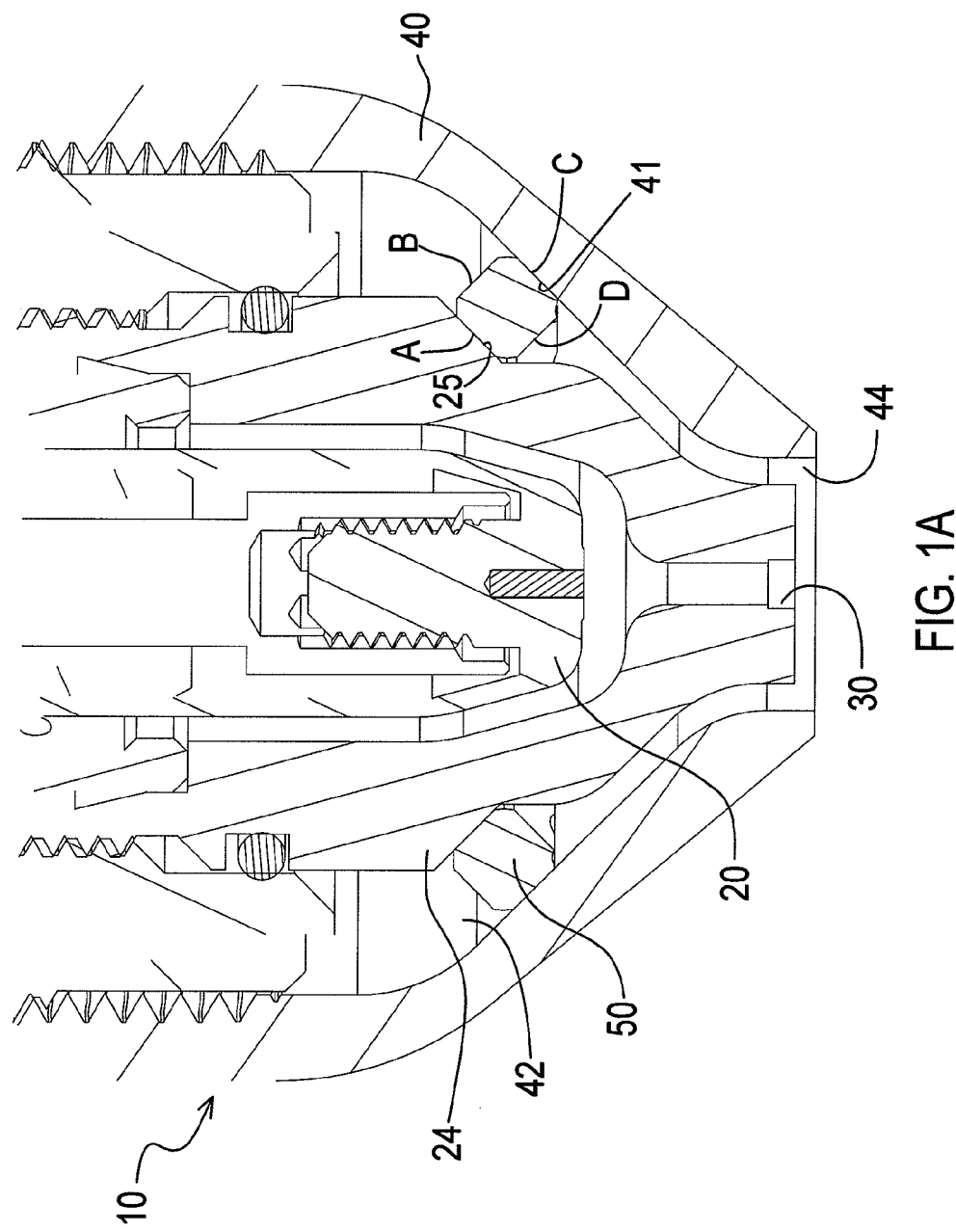
FIG. 1A is an enlarged portion of FIG. 1.
Figure 2:
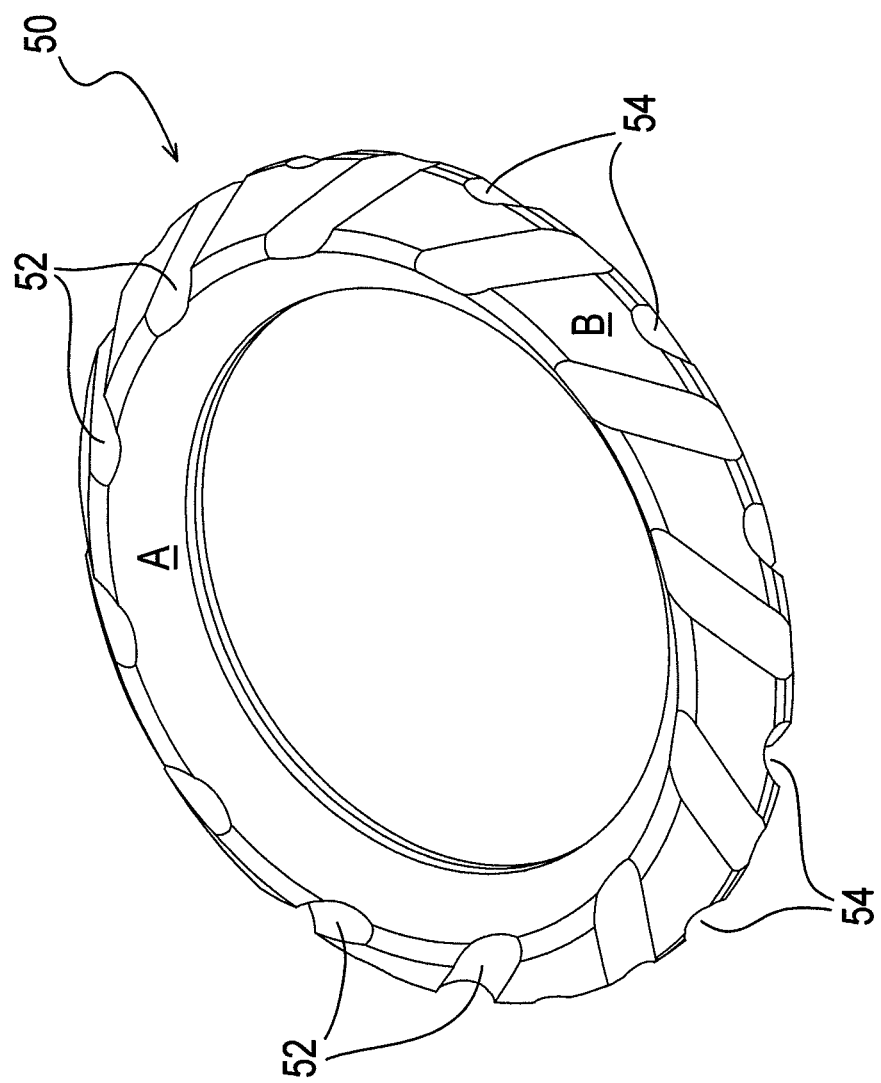
FIG. 2 is a perspective view of a baffle used in the torch of FIG. 1.
Figure 3:
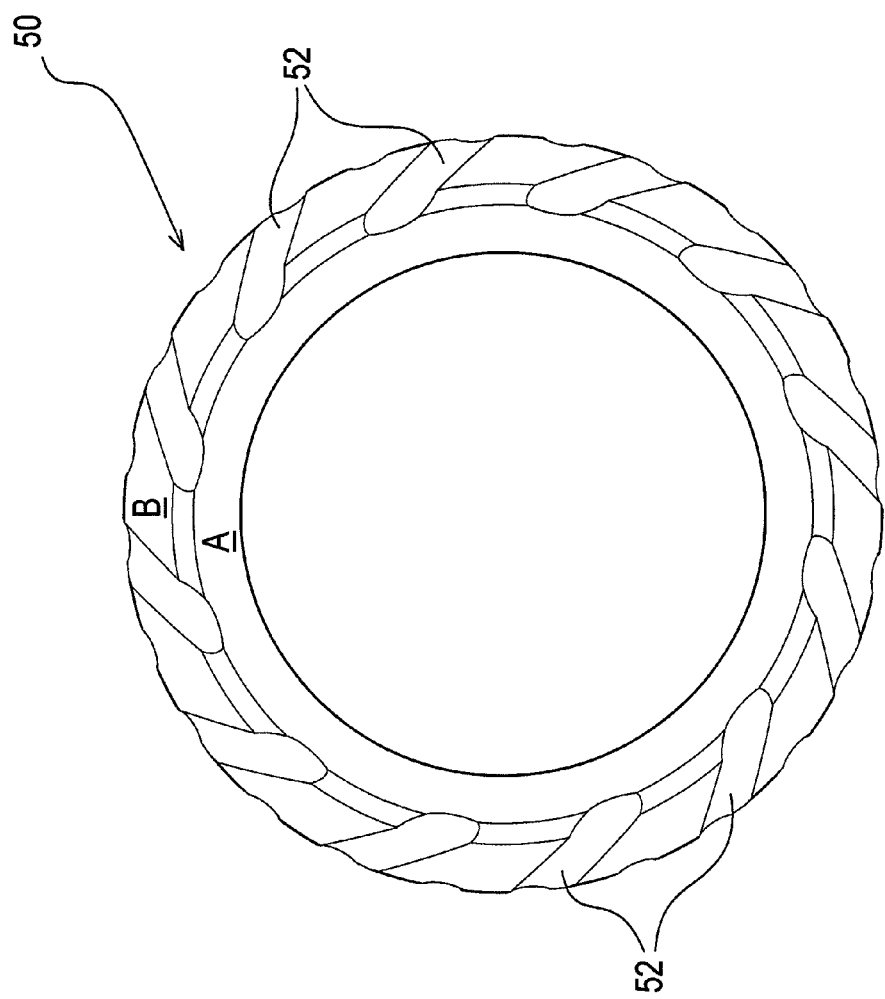
FIG. 3 is a top view of the baffle.
Figure 5:
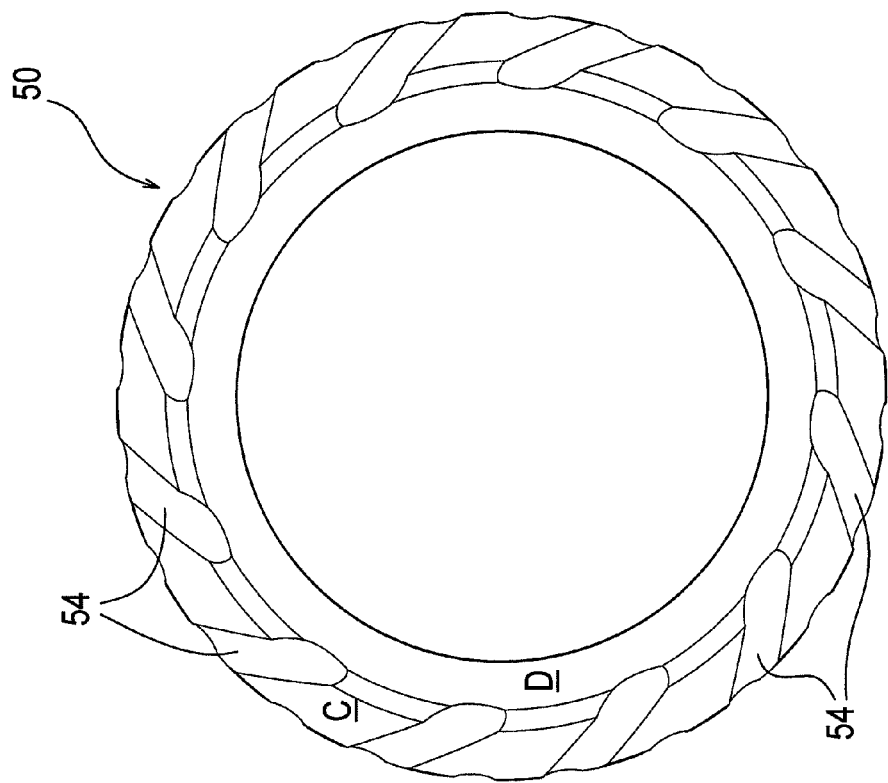
FIG. 5 is a bottom view of the baffle.
Figure 4:
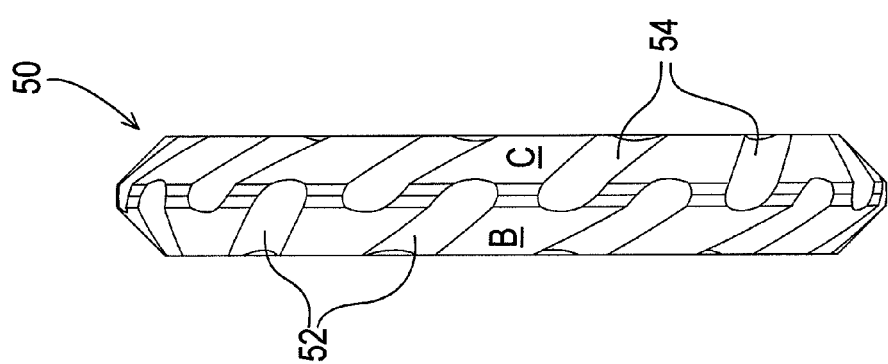
FIG. 4 is a side view of the baffle.

When the baffle 50 in installed in the orientation shown in FIG. 1A, the nozzle wall 25 and shield wall 41 close off the first passages 52, but the second passages 54 are open for fluid flow. If the baffle is flipped over to its opposite orientation, then the walls 25 and 41 close off the second passages 54, but the first passages 52 are open for fluid flow.

This reversibility of the baffle 50 can be employed for various effects or advantages. One such advantage, possessed by the illustrated baffle 50, is the ability to install the baffle in either of its two possible orientations without changing the manner in which the baffle affects the flow of fluid through it. That is, the baffle is "fool-proof" such that it cannot be inadvertently installed in the "wrong" orientation. In this regard, the baffle 50 is illustrated as being configured to impart swirl to the fluid passing through the passages that are active. The passages 52 and the passages 54 are configured to be identical in size and orientation when either one set or the other is the active set. Thus, in the first orientation as illustrated in FIG. 1A, the second passages 54 are active and impart swirl of a predetermined direction and magnitude (where "direction" is either clockwise or counterclockwise, and "magnitude" is the absolute value of the swirl angle with respect to axial). In the second orientation (flipped over relative to that of FIG. 1A), the first passages 52 are active and impart the very same direction and magnitude of swirl.

Figure 8:
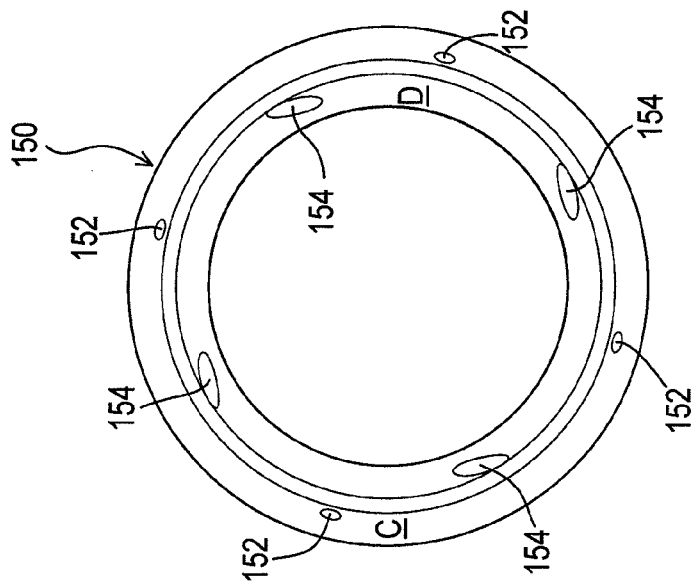
FIG. 8 is a bottom view of the baffle of FIG. 6.
Figure 7:
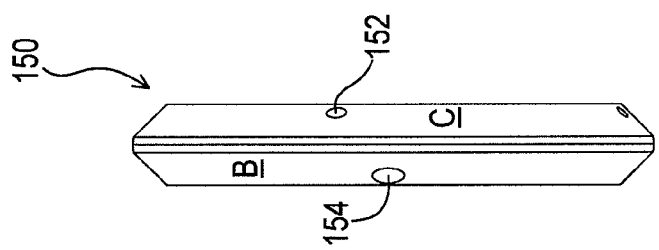
FIG. 7 is a side view of the baffle of FIG. 6.
Figure 6:
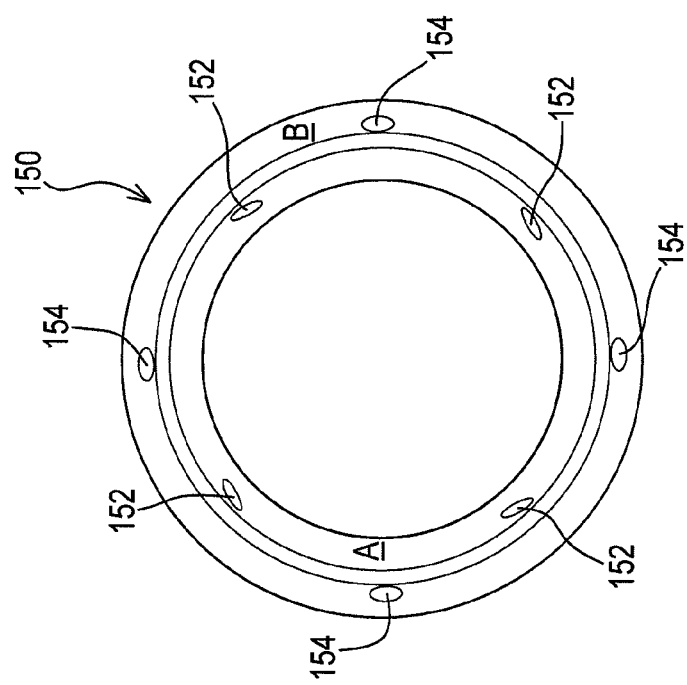
FIG. 6 is a top view of a baffle in accordance with another embodiment.

With respect to FIGS. 6 through 8, a baffle 150 in accordance with another embodiment is illustrated. The baffle 150 is similar in overall configuration to the previously described baffle, and thus has distinct faces A, B, C, and D arranged as in the prior embodiment. In this embodiment, however, the first passages 152 are holes rather than surface grooves, and they extend between the faces A and C. Likewise, the second passages 154 are holes rather than surface grooves, and they extend between the faces B and D. A further difference relative to the prior embodiment is that the first passages 152 and the second passages 154 are not configured to produce identical flow results. Instead, the first passages 152 are of smaller cross-sectional flow area than the second passages 154. The advantage of this configuration is that the baffle 150 allows the user to adjust the level of shield fluid delivered through the shield orifice 44. If in a particular process a relatively low shield fluid flow rate is desired, the baffle can be installed in the orientation in which the first (smaller) passages 152 are the active ones. If in another process a higher shield fluid flow rate is desired, then the baffle can be flipped over so the second (larger) passages 154 are the active ones.

It will also be clear from the foregoing that the two sets of passages can be configured to vary other fluid flow characteristics instead of or in addition to the flow rate. For example, the passages may be configured so that in the first orientation the baffle provides swirl at a relatively low swirl angle, and in the second orientation the baffle provides swirl at a relatively higher swirl angle.

While the baffles 50 and 150 illustrated herein are configured to produce swirl, it will be recognized that the invention is applicable to other situations where swirl may not be required or desired. Thus, the passages in the baffle can be oriented to produce flow without swirl. In this case, the baffle can be "fool-proof" as previously described, such that both sets of passages produce identical flow results. Alternatively, the baffle can have differently configured sets of passages so as to provide a flow-adjusting function depending on its orientation.

Many modifications and other embodiments of the invention set forth herein will come to mind to one skilled in the art to which this invention pertains having the benefit of the teachings presented in the foregoing descriptions and the associated drawings. For example, while the illustrated and described baffles 50, 150 have four conical faces A, B, C, and D, baffles in accordance with the invention can have one or more faces that are not conical (e.g., cylindrical). Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A plasma arc torch comprising a main torch body, an electrode, and a nozzle, a generally annular fluid flow passage being defined between a radially inner wall and a radially outer wall for flow of a fluid therethrough, the torch further comprising a generally annular baffle disposed in the generally annular fluid flow passage and engaging the radially inner and radially outer walls thereof, wherein:

the baffle defines distinct faces A, B, C, and D, the faces A and C being generally opposite from each other and the faces B and D being generally opposite from each other, a set of first passages extending between the faces A and C, and a set of second passages extending between the faces B and D, and the faces of the baffle and the radially inner and outer walls of the annular fluid flow passage being configured to cooperate such that:

in a first orientation of the baffle the first passages are open to fluid flow and the second passages are closed to fluid flow by engagement of the radially inner and outer walls with the faces B and D, and in a second orientation of the baffle, flipped over relative to the first orientation, the second passages are open to fluid flow and the first passages are closed to fluid flow by engagement of the radially inner and outer walls with the faces A and C.

2. The plasma arc torch of claim 1, wherein each of the first passages comprises a hole extending between the faces A and C, and each of the second passages comprises a hole extending between the faces B and D.

3. The plasma arc torch of claim 1, wherein each of the first passages comprises a surface groove extending between the faces A and C, and each of the second passages comprises a surface groove extending between the faces B and D.

4. The plasma arc torch of claim 1, wherein the first passages are configured to provide a first flow characteristic to the fluid flowing therethrough, and the second passages are configured to provide a second flow characteristic to the fluid flowing therethrough, the first and second flow characteristics differing from each other.

5. The plasma arc torch of claim 1, wherein the first passages are configured to impart swirl of a first magnitude and a first direction to the fluid flowing therethrough, and the second passages are configured to impart swirl of a second magnitude and a second direction to the fluid flowing therethrough.

6. The plasma arc torch of claim 5, wherein the first and second directions of the swirl are the same.

7. The plasma arc torch of claim 6, wherein the first and second magnitudes of the swirl are the same.

8. The plasma arc torch of claim 1, wherein each of the faces A, B, C, and D of the baffle is substantially conical, and the radially inner and outer walls of the generally annular fluid flow passage define substantially conical surfaces, the substantially conical faces of the baffle engaging the substantially conical surfaces of the walls so as to radially center the baffle with respect to the walls.

9. A baffle for a plasma arc torch, the baffle being generally annular and defining distinct faces A, B, C, and D, wherein faces A and C are generally opposite from each other and faces B and D are generally opposite from each other, the baffle defining a set of first passages extending between faces A and C and a set of second passages extending between faces B and D.

10. The baffle of claim 9, wherein each of the first passages comprises a hole extending between the faces A and C, and each of the second passages comprises a hole extending between the faces B and D.

11. The baffle of claim 9, wherein each of the first passages comprises a surface groove extending between the faces A and C, and each of the second passages comprises a surface groove extending between the faces B and D.

12. The baffle of claim 9, wherein the first passages are configured to provide a first flow characteristic to a fluid flowing therethrough, and the second passages are configured to provide a second flow characteristic to a fluid flowing therethrough, the first and second flow characteristics differing from each other.

13. The baffle of claim 9, wherein the first passages are configured to impart swirl of a first magnitude and a first direction to a fluid flowing therethrough, and the second passages are configured to impart swirl of a second magnitude and a second direction to a fluid flowing therethrough.

14. The baffle of claim 13, wherein the first and second directions of the swirl are the same.

15. The baffle of claim 14, wherein the first and second magnitudes of the swirl are the same.

16. The baffle of claim 9, wherein each of the faces A, B, C, and D of the baffle is substantially conical.

17. A plasma arc torch comprising a main torch body, an electrode, and a nozzle, a generally annular fluid flow passage being defined between a radially inner wall and a radially outer wall for flow of a fluid therethrough, the torch further comprising a generally annular baffle disposed in the generally annular fluid flow passage and engaging the radially inner and radially outer walls thereof, the baffle defining flow passages therethrough, and wherein:

each of the radially inner and outer walls of the generally annular fluid flow passage defines a substantially conical surface, and the baffle defines an inner conical surface and an outer conical surface, the inner and outer conical surfaces of the baffle respectively engaging the substantially conical surfaces of the inner and outer walls of the generally annular fluid flow passage so as to radially center the baffle with respect to the walls.

\* \* \* \* \*